(12) United States Patent
Tsuboi

(10) Patent No.: US 6,602,485 B1
(45) Date of Patent: Aug. 5, 2003

(54) METHOD FOR PRODUCING HYDROGEN OCCLUSION MATERIAL

(75) Inventor: Toshiyuki Tsuboi, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 09/619,651

(22) Filed: Jul. 19, 2000

(51) Int. Cl.$^7$ ............................................. C01B 31/02
(52) U.S. Cl. .............................. 423/445 R; 423/445 B; 423/447.1
(58) Field of Search ........................ 423/447.1, 447.3, 423/445 R, 445 B

(56) References Cited

U.S. PATENT DOCUMENTS 6,183,714 B1 * 2/2001 Smalley et al. .......... 423/447.3

OTHER PUBLICATIONS

Lambert, J.M. et al. 'Improving Conditions Towards Isolating Single–Shell Carbon Nanotubes' in *Chemical Physics Letters* vol. 226 pp. 364–371, Aug. 1994.*

* cited by examiner

*Primary Examiner*—Stuart L. Hendrickson
(74) *Attorney, Agent, or Firm*—Oblon, Spivak, McClelland, Maier & Neustadt, P.C.

(57) ABSTRACT

A hydrogen occlusion material producing method capable of producing a hydrogen occlusion material during preparation of a carbonaceous material such as carbon nanotubes or the like. A gas atmosphere at a predetermined pressure is formed in a chamber and then a DC current is fed to a pair of carbon electrodes from a discharge power unit while keeping the carbon electrodes spaced from each other at a predetermined interval through a pair of position control units, leading to arc discharge. This results in an anode constituted by platinum metal which exhibits both a catalytic function during preparation of carbon nanotubes and a function of dissociating hydrogen molecules into hydrogen atoms being heated, to thereby produce soot. The soot contains a large amount of hydrogen occlusion material wherein fine particles of the platinum metal are uniformly adhered to single-layer carbon nanotubes, resulting in being used for a hydrogen occlusion material.

5 Claims, 1 Drawing Sheet

METHOD FOR PRODUCING HYDROGEN OCCLUSION MATERIAL

BACKGROUND OF THE INVENTION

This invention relates to a method for producing a hydrogen occlusion material, and more particularly to a method for producing a material for occluding hydrogen therein.

In order to render hydrogen available as, for example, a power source for an automobile or the like, much effort has been directed to research and development of a hydrogen occlusion material which is capable of efficiently occluding hydrogen therein.

A method for storing hydrogen in a predetermined amount for every one time has been conventionally proposed, which is generally classified into two techniques. One is gaseous hydrogen storage techniques of storing hydrogen in the form of gas and the other is liquefied hydrogen storage techniques of storing liquefied hydrogen rather than gaseous hydrogen. In addition to the above, hydrogen storage techniques of occluding hydrogen in hydrogen occlusion alloy have been also known in the art.

The gaseous hydrogen storage techniques described above require a stout gas bomb of a relatively large volume which acts as a hydrogen storage means. This causes the gas bomb to be large-sized and increased in weight, resulting in the bomb being unsuitable for mounting on a vehicle such as an automobile or the like and inconvenient for shipping and transferring. The liquefied hydrogen storage techniques require to keep a storage section at a temperature as low as −253° C. because liquefied hydrogen must be stored in the form of liquid. This causes an apparatus for liquefied hydrogen storage to be significantly large-scaled. Thus, the latter techniques encounter such a disadvantage as in the former techniques and renders the apparatus highly expensive.

The conventional hydrogen occlusion method described above is developed for the reason that it does not encounter the above-described problem as seen in the gaseous or liquefied hydrogen storage techniques and is considered to be a means with a bright future. Hydrogen occlusion alloys used for the method include titanium alloy, magnesium alloy, rare earth alloy, palladium alloy and the like. Unfortunately, the hydrogen occlusion alloys each have a disadvantage of being relatively increased in high hydrogen discharge temperature, resulting in being of no practical use.

Recently, so-called carbon nanotubes have come to notice in the art as a hydrogen occlusion material which exhibits enhanced hydrogen occlusion characteristics (see Nature, 386, pp 377–379, 1997). However, for example, in order to permit an automobile to run by a distance as long as about 500 km, it is required to consume hydrogen in an amount of 3.1 kg. Thus, the carbon nanotubes fail to be put to practical use in view of its hydrogen storage volume and its own weight.

Also, a hydrogen storage method for storing hydrogen in a hydrogen occlusion material which may be mounted in an automobile is proposed, as disclosed in Japanese Patent Application Laid-Open Publication No. 72201/1998. In the publication, platinum metal is applied in the form of a metal film to activated carbon, fullerene, carbon nanotubes or a mixture thereof, so that the platinum metal film dissociates hydrogen molecules into hydrogen atoms. Then, the hydrogen atoms are stored in carbon nanotubes or the like.

In the hydrogen storage method disclosed in the publication, the hydrogen occlusion material is prepared by forming a film of platinum metal on a carbonaceous material such as carbon nanotubes or the like by conventional metal film formation techniques such as vacuum deposition, sputtering, CVD or the like. Thus, the manufacturing of the carbonaceous material such as carbon nanotubes or the like and metal and formation of the metal film are carried out independently from each other, so that the hydrogen storage method is highly complicated because of being increased in the number of steps and requires a large-scaled manufacturing apparatus, leading to an increase in production cost.

SUMMARY OF THE INVENTION

The present invention has been made in view of the foregoing disadvantage of the prior art.

Accordingly, it is an object of the present invention to provide a method for producing a hydrogen occlusion material which is capable of producing a hydrogen occlusion material during manufacturing of a carbonaceous material such as carbon nanotubes or the like, to thereby facilitate production of the hydrogen occlusion material at a reduced cost.

In accordance with the present invention, a method for producing a hydrogen occlusion material is provided. In the method, metal which exhibits a catalytic function of dissociating hydrogen molecules into hydrogen atoms is evaporated together with a carbon material to which a metal catalyst for producing a carbonaceous material such as carbon nanotubes or the like is added, resulting in producing the hydrogen occlusion material constituted by the metal and carbonaceous material.

The metal which exhibits the function of hydrogen molecules into hydrogen atoms may be at least one selected from the group consisting of platinum metals, oxide metals of platinum metals and alloys of platinum metals.

The metal catalyst added to the carbon material may be selected from the group consisting of Fe, Co, Ni, Y, Rh, Pd, Pt, Ru, La, Ce, Pr, Nd, Gd, Tb, Dy, Ho, Er, Lu and any mixture thereof.

The carbonaceous materials may include single-layer carbon nanotubes.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

the single FIGURE is a schematic view showing an apparatus which may be applied to a method for producing a hydrogen occlusion material according to the present invention by way of example.

DETAILED DESCRIPTION OF THE PREFERRED EMBODIMENT

Figure 1:
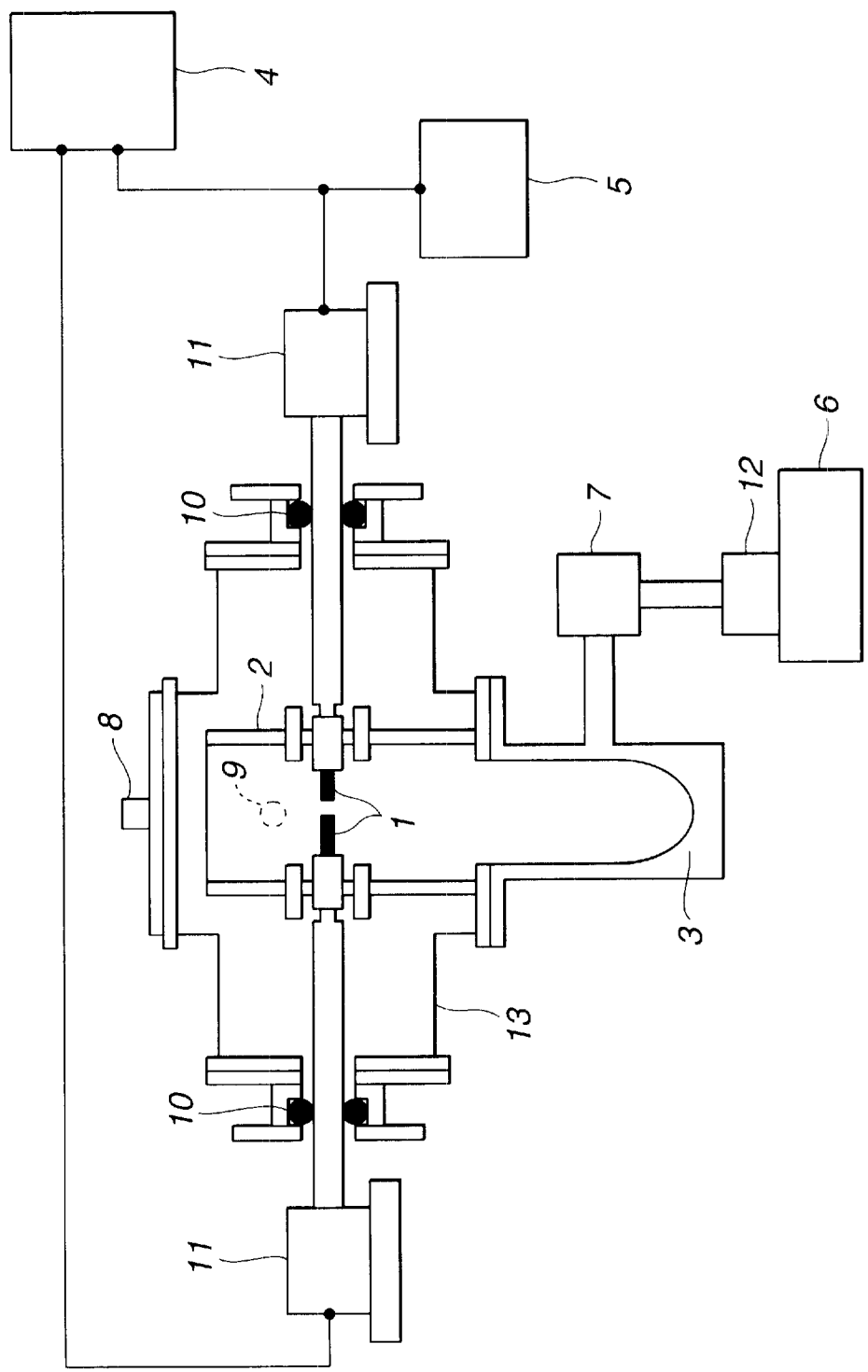

Now, a method for producing a hydrogen occlusion material according to the present invention will be described with reference to the single FIGURE.

The single FIGURE generally shows an apparatus for producing a hydrogen occlusion material which may be applied to a method for producing a hydrogen occlusion material according to the present invention by way of example. The apparatus is constructed so as to prepare a carbonaceous material such as carbon nanotubes by arc discharge.

The apparatus includes a pair of carbon electrodes 1 arranged opposite to each other so as to act as discharge electrodes, cooling pipes 2 for cooling the carbon electrodes 1, and a filter 3 for recovering soot. The apparatus also includes a power unit 4 for discharge which is constructed so as to output DC electric power, as well as AC electric power as required, a digital oscilloscope 5 for displaying a waveform of an output of the power unit 4, a rotary vacuum pump 6, and a vacuum pump 7 for the rotary vacuum pump 6. Reference numeral 8 designates an inspection hole through which the discharge is observed, 9 is a gas inlet port, 10 is an O-ring for providing airtightness, 11 is a pair of position control units, 12 is an electromagnetic valve, and 13 is a chamber.

One of the carbon electrodes 1 in a pair or an anode has catalytic metal added thereto.

The anode is formed of a carbon material to which metal exhibiting a catalytic function of dissociating hydrogen molecules into hydrogen atoms is added. More particularly, it may be made of a carbon material such as graphite or the like to which at least one metal selected from the group consisting of platinum metals such as, for example, Ru, Rh, Os, Ir, Pd and Pt, oxide metals of platinum metals, and alloys of platinum metals such as, for example, Pb—Rh, Rh—Pt, Pd—Ph, Pd—Ph—Pt and the like is added.

The platinum metals, the oxide metals thereof and the alloys thereof described above exhibit not only a catalytic function of dissociating hydrogen molecules into hydrogen atoms but a catalytic function of producing a carbonaceous material such as nanocapsules, carbon nanotubes or the like. In particular, Ph, Pd and Pt each exhibit a catalytic function of producing single-layer carbon nanotubes.

The hydrogen occlusion material producing apparatus constructed as described above permits a hydrogen occlusion material required to be produced in a step of producing a carbonaceous material such as carbon nanotubes or the like as described in detail hereinafter.

For this purpose, first of all, the chamber 13 is formed therein with a rare gas atmosphere or hydrogen atmosphere at a predetermined pressure of, for example, between 50 Torr and 1000 Torr. Under such circumstances, the carbon electrodes 1 are fed with DC electric power from the discharge power unit 4 while being kept opposite to each other at a predetermined interval by means of the position control units 11, resulting in arc discharge occurring between the carbon electrodes 1. Alternatively, arc discharge between the carbon electrodes may be carried out by AC arc discharge techniques using feeding of AC electric power to the carbon electrodes 1, pulse arc discharge techniques using feeding of a pulse current thereto or the like.

The arc discharge thus carried out permits the above-described anode to be heated, so that the materials of which the anode is made or the carbon and catalytic metal added thereto may be evaporated. Also, this leads to production of soot, which is then collected by the filter 3. The soot thus recovered contains a large amount of hydrogen occlusion material constituted by the single-layer carbon nanotubes which is a carbonaceous material and fine particles of the added catalytic metal adhered to the carbon nanotubes.

In this instance, as described above, the platinum metal or the like exhibits a hydrogen occlusion capability and concurrently functions as a catalyst during preparation of the carbon nanotubes. Thus, the carbon material to which the platinum metal, the oxide metal thereof or the alloy thereof is added as a catalytic metal permits the hydrogen occlusion material to be readily produced at a low cost during preparation of the carbonaceous material such as the carbon nanotubes.

Occlusion of hydrogen in the hydrogen occlusion material thus produced may be carried out by receiving the hydrogen occlusion material in a container (not shown) of a hydrogen adsorption and desorption unit separately arranged and introducing hydrogen into the container. Then, the container is heated and cooled as required, to thereby occlude hydrogen in the hydrogen occlusion material. Release of hydrogen from the hydrogen occlusion material having hydrogen thus occluded therein is carried out by merely heating the container or isolating the container from cooling.

In the illustrated embodiment, the hydrogen occlusion material is made of the carbon material containing the platinum metal, the oxide metal thereof or the alloy thereof. Alternatively, the hydrogen occlusion material may be made by adding at least one selected from Fe, Co, Ni, Y, Rh, Pd, Pt, Ru, La, Ce, Pr, Nd, Gd, Tb, Dy, Ho, Er, Lu and any alloy thereof such as, for example, Ni—Y—Pd, Fe—Ni—Pt or the like which exhibit enhanced characteristics as a metal catalyst for the single-layer carbon nanotubes to the carbonaceous material containing the metal.

Also, metal exhibiting enhanced hydrogen adsorption capability such as, for example, Ti, Zr, Hf, Cu, Mg, Ca, V, Nb or the like or alloy thereof may be added thereto. In particular, Ti or Ti alloy is useful as a trapping agent for trapping oxygen acting as an inhibitor during production of the single-layer carbon nanotubes, leading to effective production of the single-layer carbon nanotubes and the hydrogen occlusion material containing the above-described metal.

Further, in the illustrated embodiment, the anode is made of the platinum metal, the oxide metal thereof or the alloy thereof and the carbon material containing Cu or Y. In addition, evaporation of the anode is carried out while maintaining a hydrogen atmosphere in the chamber 13. Such construction permits production of the multi-layer carbon nanotubes which is a carbonaceous material, which may be used for the hydrogen occlusion material.

Furthermore, in the illustrated embodiment, evaporation of the anode is carried out by arc discharge techniques. Alternatively, laser heating techniques wherein heating is carried out by laser, resistance heating techniques wherein heating is carried out by electrical resistance or the like may be effectively used for this purpose.

Then, the hydrogen occlusion material thus produced is deposited on hydrogen occlusion alloy, resulting in being intimately adhered to the latter.

More particularly, the carbonaceous material produced as described above and containing the carbon nanotubes is ground by means of a grinder and then placed in acetone acting as a dispersing medium. Then, the material is fully dispersed in the dispersing medium by ultrasonic waves and then is left to stand for a while. Thereafter, an upper half of the dispersion is recovered. The hydrogen occlusion alloy is placed in the container and the carbonaceous material dispersion thus recovered is downwardly spread on the hydrogen occlusion alloy, followed by natural drying. This permits the hydrogen occlusion material to be intimately adhered to the hydrogen occlusion alloy, resulting in the hydrogen occlusion alloy being significantly increased in hydrogen occlusion capability.

The illustrated embodiment has been described in connection with the single-layer or multi-layer carbon nanotubes by way of example. However, a hydrogen occlusion material constituted by a carbonaceous material such as fullerene, nanoparticles or nanocapsules and the above-described metal may be likewise produced.

As can be seen from the foregoing, in the method of the illustrated embodiment, the carbon material such as carbon, graphite or the like is evaporated together with the metal exhibiting an action of dissociating hydrogen molecules into hydrogen atoms by arc discharge techniques, laser heating techniques or the like, so that the hydrogen occlusion material containing the above-described metal and the carbonaceous material such as the single-layer or multi-layer carbon nanotubes, fullerene, nanoparticles or nanocapsules may be produced.

Also, in the method of the illustrated embodiment, the carbon material such as carbon, graphite or the like is subjected to arc discharge, laser heating or the like together with the metal catalyst exhibiting both a function of dissociating hydrogen molecules into hydrogen atoms and a catalytic function during production of the carbonaceous material, to thereby be evaporated, resulting in providing the hydrogen occlusion material containing the above-described metal and the carbonaceous material.

Metal which acts to dissociate hydrogen molecules into hydrogen atoms and metal which carries out both a function of dissociating hydrogen molecules into hydrogen atoms and a catalytic function during production of the carbonaceous material each may be at least one selected from the group consisting of platinum metals, oxide metals of the platinum metals and alloys of the platinum metals.

In addition, the carbon material may have at least one selected from the group consisting of Fe, Co, Ni, Y, Rh, Pd, Pt, Ru, La, Ce, Pr, Nd, Gd, Tb, Dy, Ho, Er, Lu and any alloy thereof added thereto so as to act as a metal catalyst.

Therefore, the method of the present invention permits the hydrogen occlusion material to be produced during production of the carbonaceous material such as the carbon nanotubes or the like, to thereby facilitate production of the hydrogen occlusion material while reducing a production cost.

Further, it permits the hydrogen occlusion material which exhibits an enhanced hydrogen occlusion capability as high as 15% or more based on its weight to be readily produced at a reduced manufacturing cost.

Also, the hydrogen occlusion material produced as described above is reduced in weight, so that the present invention permits hydrogen of which handling is troublesome in the prior art to be safely utilized and transported. This results in effective utilization of clean hydrogen energy being realized in place of fossil fuel causing environmental pollution.

Further, in the present invention, desorption and adsorption of hydrogen with respect to the hydrogen occlusion material are due to endothermic and exoergic reactions, so that heat obtained during the reactions may be directed to any other application such as air conditioning or the like. Also, it may be applied to an actuator for converting thermal energy into mechanical energy. Further, it may be utilized for an electric field or electron emitting source.

As can be seen form the foregoing, the method of the present invention permits the hydrogen occlusion material to be produced during preparation of the carbonaceous material such as the carbon nanotubes or the like, resulting in the hydrogen occlusion material being readily provided while being reduced in manufacturing cost, so that the hydrogen occlusion material which exhibits an enhanced hydrogen occlusion capability may be produced.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for producing a hydrogen occlusion material, comprising the steps of:

vaporizing by arc discharge a carbon material containing a metal-containing component exhibiting a catalytic function of dissociating hydrogen molecules into hydrogen atoms, said metal-containing component being at least one (1) platinum group metal selected from the group consisting of Rh, Os, Ir, and Pd, (2) metal oxide of said platinum group metals or (3) alloy of said platinum group metals, and a metal catalyst, said metal catalyst being one or more metals or alloys thereof selected from the group consisting of Y, Rh, Pd, Ru, La, Ce, Pr, Nd, Gd, Ho, Er, and Lu, and recovering a hydrogen occlusion material comprising a carbonaceous material containing a metal of said metal-containing component and metal catalyst produced as a result of the vaporization of the mixture of carbon material, the metal-containing component and the metal catalyst.

2. A method as defined in claim 1, wherein said carbonaceous material contains fullerene.

3. A method as defined in claim 1, wherein said carbonaceous material contains nanoparticles.

4. A method as defined in claim 1, wherein said carbonaceous material contains nanocapsules.

5. A method as defined in claim 1, wherein said carbonaceous material contains single-layer carbon nanotubes.

* * * * *

UNITED STATES PATENT AND TRADEMARK OFFICE
CERTIFICATE OF CORRECTION

PATENT NO.     : 6,602,485 B1                                          Page 1 of 1
DATED          : August 5, 2003
INVENTOR(S)    : Tsuboi It is certified that error appears in the above-identified patent and that said Letters Patent is hereby corrected as shown below:

<u>Title page,</u>
Item [30], Foreign Application Priority Data has been omitted. It should read:

-- [30]       Foreign Application Priority Data

Jul. 26, 1999      (JP) ..............................11-210421 --

Signed and Sealed this

Twenty-fifth Day of November, 2003

JAMES E. ROGAN
*Director of the United States Patent and Trademark Office*